(12) United States Patent
Karame et al.

(10) Patent No.: US 11,722,322 B2
(45) Date of Patent: *Aug. 8, 2023

(54) METHOD FOR PROVIDING INFORMATION TO BE STORED AND METHOD FOR PROVIDING A PROOF OF RETRIEVABILITY

(71) Applicant: NEC CORPORATION, Tokyo (JP)

(72) Inventors: Ghassan Karame, Heidelberg (DE); Frederik Armknecht, Mannheim (DE)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,872

(22) Filed: Oct. 6, 2022

(65) Prior Publication Data

US 2023/0038304 A1 Feb. 9, 2023

Related U.S. Application Data

(63) Continuation of application No. 16/468,714, filed as application No. PCT/EP2016/081076 on Dec. 14, 2016, now Pat. No. 11,502,856.

(51) Int. Cl.
*H04L 29/06* (2006.01)
*H04L 9/32* (2006.01)
(Continued)

(52) U.S. Cl.
CPC ........ *H04L 9/3271* (2013.01); *G06F 12/0646* (2013.01); *H04L 9/0869* (2013.01); *H04L 9/0894* (2013.01); *G06F 2212/1044* (2013.01)

(58) Field of Classification Search
CPC ... H04L 9/3271; H04L 9/0869; H04L 9/0894; G06F 12/0646; G06F 2212/1044
See application file for complete search history.

(56) References Cited

U.S. PATENT DOCUMENTS

| 8,346,742 B1 | 1/2013 | Juels et al. |
| 8,381,062 B1 | 2/2013 | Juels et al. |

(Continued)

OTHER PUBLICATIONS

Armknecht et al., Outsourced Proofs of Retrievability, Proceedings of the ACM Conference on Computer and Communications Security; IDS dated Oct. 25, 2022. (Year: 2014).*

(Continued)

*Primary Examiner* — Kendall Dolly
(74) *Attorney, Agent, or Firm* — Leydig, Voit & Mayer, Ltd.

(57) ABSTRACT

A method for storing information includes receiving information to be stored and an information tag from a user computing entity, and storing the information and the information tag. The information to be stored includes a chunk that is divided into a plurality of blocks each comprising one or more elements. The information tag comprises a plurality of tags each having been computed for one of the blocks, wherein the tag for the j-th block of the i-th chunk is based on: an output of a random function using as input: 1) an output of an index function mapping each index j to a certain value, and/or 2) a seed sampled for the i-th chunk; the j-th block; and a representation of a second secret comprising one or more random elements each associated with a respective one of the one or more elements of one of the blocks.

19 Claims, 5 Drawing Sheets

(51) Int. Cl.
*G06F 12/06* (2006.01)
*H04L 9/08* (2006.01)

(56) References Cited

U.S. PATENT DOCUMENTS

| | | | | |
|---|---|---|---|---|
| 8,694,467 | B2* | 4/2014 | Sun | G06F 16/10 |
| | | | | 707/661 |
| 8,706,701 | B1* | 4/2014 | Stefanov | G06F 16/1824 |
| | | | | 713/160 |
| 10,474,831 | B1* | 11/2019 | Volkanov | G06F 21/6218 |
| 2008/0123863 | A1* | 5/2008 | Bade | G06F 21/6209 |
| | | | | 380/278 |
| 2011/0246433 | A1 | 10/2011 | Sun | |
| 2015/0309863 | A1* | 10/2015 | Shi | H03M 13/373 |
| | | | | 714/819 |

OTHER PUBLICATIONS

Batrinca, B., Treleaven, P.C. Social media analytics: a survey of techniques, tools and platforms. AI & Soc 30, 89-116 (2015). https://doi.org/10.1007/s00146-014-0549-4 (Year: 2015).*

Armknecht, F. et al. "Outsourced Proofs of Retrievability," Proceedings of the ACM Conference on Comuter and Communications Security: 1-13 (Dec. 2014).

Shacham H. et al.; "Compact Proofs of Retrievability" In: Pieprzyk, J. (eds) Advances in Cryptology—ASIACRYPT 2008. ASIACRYPT 2008. Lecture Notes in Computer Science, vol. 5350 Springer, Berlin, Heidelberg, pp. 1-38 (Dec. 2008). https://doi.org/10.1007/978-3-540-89255-7_7.

U.S. Appl. No. 16/468,714, filed Jun. 12, 2019.

* cited by examiner

METHOD FOR PROVIDING INFORMATION TO BE STORED AND METHOD FOR PROVIDING A PROOF OF RETRIEVABILITY

CROSS-REFERENCE TO PRIOR APPLICATIONS

This application is a continuation application of U.S. patent application Ser. No. 16/468,714 filed on Jun. 12, 2019, which is a U.S. National Stage Application under 35 U.S.C. § 371 of International Application No. PCT/EP2016/081076 filed on Dec. 14, 2016. The International Application was published in English on Jun. 21, 2018, as WO 2018/108271 A1 under PCT Article 21(2), which applications are hereby incorporated by reference herein.

FIELD

The present invention relates to a method for providing information to be stored, said method being performed in a memory available to one or more computation devices.

The present invention further relates to a method for providing a proof of retrievability, 'POR', for stored information, said method being performed in a memory available to one or more computation devices.

The present invention further relates to a method for changing stored information on a storage entity, said method being performed in a memory available to one or more computation devices.

The present invention even further relates to a computing entity for providing information to be stored.

The present invention even further relates to a system for providing a proof or retrievability, 'POR', for stored information, comprising a user entity and a storage entity.

The present invention even further relates to a non-transitory computer readable medium storing a program causing a computer to execute a method for providing information to be stored.

The present invention even further relates to a non-transitory computer readable medium storing a program causing a computer to execute a method for providing a proof of retrievability, 'POR', for stored information.

Although applicable to any kind of information, the present invention will be described with regard to information in form of a file.

Although applicable in general to any kind of storing devices, the present invention will be described with regard to storage devices in form of a cloud storage.

BACKGROUND

Cloud services are increasingly gaining importance and applicability in numerous application domains such as storage, computing services, collaboration platforms, etc. Clouds provide a huge economic benefit offer to companies as well as private individuals and public organizations to deploy or provision cloud services in a cost effective manner. However cloud storage and computation services introduce new threads to data security. Customers of cloud services lose control over their data and how their data is processed or stored. This makes users reluctant to use cloud services.

To address this problem, i.e. to enable users to verify the integrity and availability of their outsourced data so-called proofs of retrievability as disclosed in the non-patent literature of NAOR, M., AND ROTHBLUM, G. N. The Complexity of Online Memory Checking. In FOCS (2005), pp. 573-584, have been proposed. These proofs of retrievability, 'POR', provide end clients with the assurance that their data is still available and can be entirely downloaded if needed.

Proofs of Retrievability, 'POR', are cryptographic proofs, e.g. also shown in the non-patent literature of SHACHAM, H., and WATERS, B. Compact Proofs of Retrievability, in ASIACRYPT (2008), pp. 90-107, enabling a cloud provider to prove that a user can retrieve his file in its entirety. POR can be frequently executed by the user to ensure that their files stored on the cloud can be fully retrieved at any point in time. To conduct and verify a POR, users need to be equipped with devices that have network access, and that can tolerate the (non-negligible) computational overhead incurred by the verification process.

In the non-patent literature of Frederik Armknecht, Jens-Matthias Bohli, Ghassan Karame, Zongren Liu, Christian Reuter, Outsourced Proofs of Retrievability In Proceedings of the ACM Conference on Computer and Communications Security (ACM CCS), Arizona, USA, 2014 so-called outsourced Proofs of Retrievabilty are described in which users can task an external auditor to perform and verify a POR with a cloud provider.

SUMMARY

In an embodiment, the present invention provides a method for storing information. The method includes receiving information to be stored and an information tag from a user computing entity, and storing the information and the information tag. The information to be stored includes at least one chunk that is divided into a plurality of blocks each comprising one or more elements. The information tag comprises a plurality of tags each having been computed for one of the blocks, wherein the tag for the j-th block of the i-th chunk is based on: an output of a random function using as input at least one of: 1) an output of an index function mapping each index j to a certain value, and 2) a seed sampled for the i-th chunk; the j-th block; and at least a one-dimensional representation of a second secret comprising one or more random elements, wherein a respective one of the one or more random elements is associated with a respective one of the one or more elements of one of the plurality of blocks.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

While the conventional systems may be effective in detecting data loss, they may lack performance or lack flexibility, e.g. they do not support dynamic updates of stored files, for example a partial write, inserting of new blocks or removing of blocks. Existing dynamic proofs of retrievability, 'POR', penalize users and cloud providers with respect to the computational overhead.

Therefore, one of the problems addressed by embodiments of the present invention is to enhance flexibility, in particular for instance enable dynamic updates with enhanced efficiency with respect to computational resources necessary.

In an embodiment the present invention provides a method for providing information to be stored, said method being performed in a memory available to one or more computation devices, comprising the steps of
  a) Computing, by a user computing entity, a first secret for generating a random value based on a random function,
  b) Providing the information to be stored as at least one chunk,
  c) Dividing each chunk into a plurality of blocks, wherein each block comprises one or more elements, wherein each element may have the same size of bits,
  d) Computing, by said user computing entity, a second secret, said second secret comprising one or more random elements, a random element being associated with an element of a block,
  e) Computing a tag for each block in each chunk, wherein the tag for the j-th block of the i-th chunk is computed using
    the output of said random function on input of at least one of
      1) an output of an index function mapping each index j to a certain value and
      2) a seed sampled for the i-th chunk,
    the j-th block and
    at least a one dimensional representation of said second secret,
  f) Computing an information tag comprising said computed tags of each block of each chunk,
  g) Providing information to be stored, said information comprising the information to be stored together with said information tag, and
  h) at least said first secret and said second secret may be stored by the user computing entity.

In a further embodiment the present invention provides a method for providing a proof of retrievability, 'POR', for stored information according to an embodiment, said method being performed in a memory available to one or more computation devices, comprising the steps of
  A) Computing, by a user computing entity, a challenge, said challenge comprising at least one of
    at least one index of a block,
    at least one coefficient associated with said indices of said at least one block
  B) Sending, by a user computing entity, said challenge to a storage entity, said storage entity providing information stored according to an embodiment,
  C) Computing, by said storage entity, a response, said response comprising a combination of at least the blocks corresponding to the one or indices of said challenge and a combination of the file tags associated with at least said blocks,
  D) Verifying, by the user computing entity, said response using a stored first secret and a stored second secret by comparing if
    a combination of the blocks in combination with said second secret and a combination of the output of the values of said random function based on said first secret with the values provided by the index function on input of the at least one index of the challenge with the file tag, and
  E) Upon positive verification, providing a POR for said file.

In a further embodiment the present invention provides a method for changing stored information on a storage entity provided according to an embodiment, said method being performed in a memory available to one or more computation devices, wherein
  a) For updating a block of the stored information, a new tag for said block is computed by a user computing entity and said new tag and a new block to replace the block to be updated is sent to the storage entity and wherein said storage entity determines the position of the block within said stored information to be replaced, replaces the block with the new block at said determined position and the corresponding tag with the new tag, and wherein
  b) For deleting a block of the stored information, the position of the block to be deleted within said stored information is determined, the storage entity deletes said block and the remaining blocks with an index higher than the index associated with the position of the deleted block are shifted subsequently to fill the position of said deleted block, and wherein if necessary the tags for one or more of said shifted blocks are updated using at least one of computing updated tags by the user and computing tag updating information by the user, sending said tag updating information to the storage entity, wherein the storage entity then computes updated tags based on the received tag updating information, and wherein
  c) For inserting a block of the stored information, the position of the block to be inserted is determined, the blocks with an index higher than or equal to the index associated with the position of the block to be inserted are shifted subsequently to free the determined position, the block to be inserted is inserted at said freed position, and wherein if necessary the tags for one or more of said shifted blocks are updated using at least one of computing updated tags by the user and computing tag updating information by the user, sending said tag updating information to the storage entity, wherein the storage entity then computes updated tags based on the received tag updating information.

In an even further embodiment the present invention provides a computing entity for providing information to be stored, adapted to perform the following steps of
  a) Computing a first secret for generating a random value based on a random function,
  b) Providing the information to be stored as at least one chunk,
  c) Dividing each chunk into a plurality of blocks, wherein each block comprises one or more elements, wherein each element may have the same size of bits, d) Computing a second secret, said second secret comprising one or more random elements, a random element being associated with an element of a block,
e) Computing a tag for each block in each chunk, wherein the tag for the j-th block of the i-th chunk is computed using
  the output of said random function on input of at least one of
    1) an output of an index function mapping each index j to a certain value and
    2) a seed sampled for the i-th chunk,
  the j-th block and
  at least a one dimensional representation of said second secret,
f) Computing an information tag comprising said computed tags of each block of each chunk,
g) Providing information to be stored, said information comprising the information to be stored together with said information tag, wherein
h) at least said first secret and said second secret may be stored.

In an even further embodiment the present invention provides a system for providing a proof of retrievability, 'POR', for stored information according to an embodiment, said system comprising a user computing entity and a storage entity, wherein said user computing entity is adapted to
  A) Compute a challenge, said challenge comprising at least one of
    at least one index of a block,
    at least one coefficient associated with said indices of said at least one block,
  B) Send said challenge to a storage entity, said storage entity providing information stored according to an embodiment,
  D) Verify a response using a stored first secret and a stored second secret by comparing if a combination of the blocks in combination with said second secret and a combination of the output of the values of said random function based on said first secret with the values provided by the index function on input of the at least one index of the challenge with the file tag, and
  E) Upon positive verification, to provide a POR for said file,
and wherein said storage entity is adapted to
  C) Compute a response, said response comprising a combination of at least the blocks corresponding to the one or indices of said challenge and a combination of the file tags associated with at least said blocks.

In a further embodiment the present invention provides a non-transitory computer readable medium storing a program causing a computer to execute a method for providing information to be stored, said method being performed in a memory available to one or more computation devices, comprising the steps of
  a) Computing by a user computing entity a first secret for generating a random value based on a random function,
  b) Providing the information to be stored as at least one chunk,
  c) Dividing each chunk into a plurality of blocks, wherein each block comprises one or more elements, wherein each element may have the same size of bits,
  d) Computing, by said user computing entity, a second secret, said second secret comprising one or more random elements, a random element being associated with an element of a block,
  e) Computing a tag for each block in each chunk, wherein the tag for the j-th block of the i-th chunk is computed using
    the output of said random function on input of at least one of
      1) an output of an index function mapping each index j to a certain value and
      2) a seed sampled for the i-th chunk,
    the j-th block and
    at least a one dimensional representation of said second secret,
  f) Computing an information tag comprising said computed tags of each block of each chunk,
  g) Providing information to be stored, said information comprising the information to be stored together with said information tag, wherein
  h) at least said first secret and said second secret may be stored by the user computing entity.

In an even further embodiment the present invention provides a non-transitory computer readable medium storing a program causing a computer to execute a method for providing a proof of retrievability, 'POR', for stored information according to an embodiment, said method being performed in a memory available to one or more computation devices, comprising the steps of
  A) Computing, by a user computing entity, a challenge, said challenge comprising at least one of
    at least one index of a block,
    at least one coefficient associated with said indices of said at least one block,
  B) Sending, by a user computing entity, said challenge to a storage entity, said storage entity providing information stored according to an embodiment,
  C) Computing, by said storage entity, a response, said response comprising a combination of at least the blocks corresponding to the one or indices of said challenge and a combination of the file tags associated with at least said blocks,
  D) Verifying, by the user computing entity, said response using a stored first secret and a stored second secret by comparing if
    a combination of the blocks in combination with said second secret and a combination of the output of the values of said random function based on said first secret with the values provided by the index function on input of the at least one index of the challenge with the file tag, and
  E) Upon positive verification, providing a POR for said file.

At least one embodiment may have at least one of the following advantages:
  Enabling a very efficient proof of retrievability
  Using on computationally non-expensive operations
  Providing high flexibility, in particular in terms of supporting dynamic updates of files.

The terms "computing device", "computing entity" or "storage entity", "client", "client entity", or similar terms refer in particular in the claims, preferably in the specification each to a device or entity adapted to perform computing like a personal computer, a tablet, a mobile phone, a server, a router, a switch or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices or computing entities may be adapted in such a way that the corresponding steps to be computed are performed in an optimized way. For instance different steps may be performed in parallel with a single processor on different of its cores. Further the computing devices or computing entities may be identical forming a single computing device.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The term "storage entity" refers in particular in the claims, preferably in the specification to a computing entity or computing device adapted to store data or information.

Figure 5:
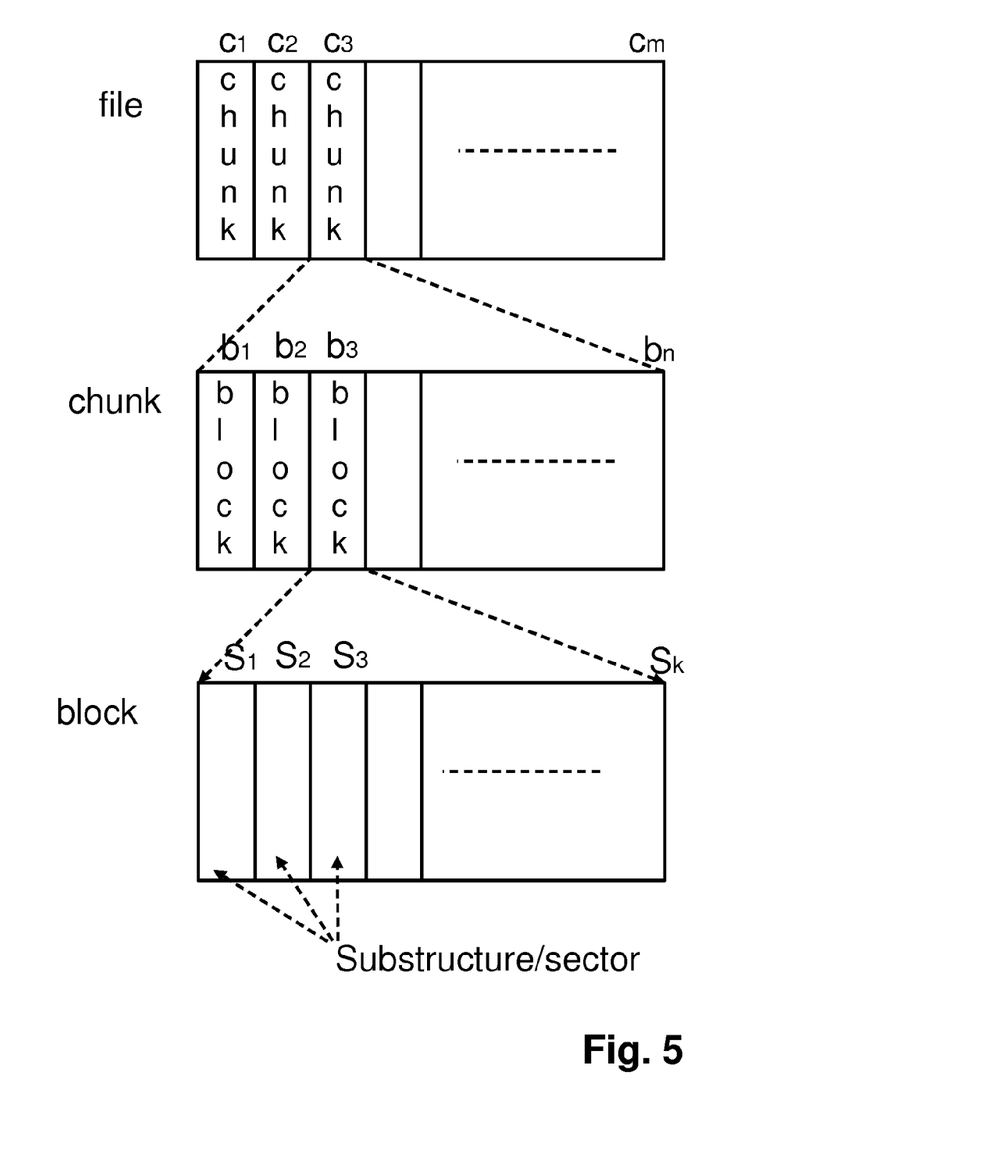
FIG. 5 shows an information structure according to an embodiment of the present invention.

The terms "chunk" and "block" are to be understood in their broadest sense and refer each to at least a part of a certain amount of information, e.g. of a file. For instance the certain amount of information has or is divided into a plurality of chunks wherein the chunks may have identical or different size, length or the like. Each chunk may have a number of blocks, wherein the blocks may have the same size or a different size within said chunk. FIG. 5 shows an exemplary dependency between chunks, blocks and elements or sectors.

The terms "element" or similarly or interchangeably the term "sector" or similarly or interchangeably the term "substructure" with regard to the terms "chunk" or "block" are to be understood in their broadest sense and refer in particular in the claims, preferably in the specification to any kind of already present, defined or imposed physical or virtual part of or within a chunk or a block. For example an element or sector comprises or is one bit.

The term "representation" with regard to the term "element" refers to any kind of virtual information, structure, principle, function or the like reflecting, representing, etc. the element or substructure. For instance, a one dimensional representation may be a vector comprising entries each reflecting or representing an element. As a first further example a representation may be provided in form of a vector comprising m entries, each entry representing an element having the size of one bit. As a second example a representation may be provided in form of a matrix comprising m x n entries, the entries reflecting elements of the i-th chunk of the j-th block with $1 \leq i \leq m$ and $1 \leq j \leq n$.

The term "AES" refers the Advanced Encryption Standard AES, also known as Rijndael, being a specification for the encryption of electronic data.

The term "challenge" and the term "response" are to be understood in their broadest sense and refer in particular in the claims, preferably in the specification to a part of a challenge response authentication describing in general that one party presents a question—challenge—and another party must provide a valid answer—response—to be authenticated.

The term "verifying" is to be understood in its broadest sense and refers in particular in the claims, preferably in the specification to a procedure performing reviewing, investigating, (re)checking, controlling, confirming, (re)assuring, attesting, affirming, certifying, etc.

The term "tag" is to be understood in its broadest sense and refers in particular in the claims, preferably in the specification to any kind of information, data, metadata or the like, being associated with other data or information.

The term "shifting" with regard to updating, deleting or inserting a block is to be understood in its broadest sense and refers in particular in the claims, preferably in the specification to any kind of moving the location, a locomotion, etc. of a block to a new position within a certain physical or virtual arrangement of information, data or the like.

The term "index" is to be understood in its broadest sense and refers in particular in the claims, preferably in the specification to a numbering of blocks, chunks or the like arranged in a certain order within a physical or virtual structured amount of information, data, etc.

The term "subsequently" with regard to the term "shifting" is to be understood in its broadest sense and refers in particular in the claims, preferably in the specification to a successive movement of a number of blocks, chunks or in general any kind of ordered data, such that a first part of the data is moved to a new location, then a second part is moved to a location, e.g. to the former location of the first part, then a third part is moved and so on.

The term "tag updating information" refers in particular in the claims, preferably in the specification to information or data of a first party to be provided to a second party such that the second party can generate, compute, etc. tags for said data or information using said tag updating information.

The term "seed" or similarly or interchangeably the term "nounce" is to be understood in its broadest sense and refers in particular in the claims, preferably in the specification to a randomly chosen value.

Further features, advantages and further embodiments are described or may become apparent in the following:

Said index function may be the identity function. Using the identity function as index function enables a computation of the index function with only very few computational resources.

The information to be stored in step b) may be provided as one chunk. This minimizes the required computational resources since one "division layer" dividing the information to be stored is avoided.

Said representation may be computed as a matrix. This enables an efficient and fast computation.

The size of the elements may be computed such to be one bit. This enables a fine granular substructure which is also physically present. Further, this enhances the flexibility since there is no restriction in the length of the blocks or the chunks.

Prior to at least step b) an information dispersal procedure may be applied on the information to be stored. This enables when a message comprising k symbols is transformed into a longer message with n symbols such that the original message can be recovered from a subset of the n symbols.

The blocks may be computed such that the size of the blocks is identical or a multiple of the underlying CPU architecture of a computing entity performing at least one of the steps a)-g). For example when using 32 bit or 64 bit systems parallelization and thus efficient computation of at least one of the steps a)-g) is possible.

Each chunk may have the same number of blocks. This further reduces the computational effort such that different chunk sizes in terms of blocks are not required to be considered.

Step e) may be performed using XOR- and/or AND-operations. This enables the use of computationally non-expensive operations further reducing the necessary computational resources.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

Figure 1:
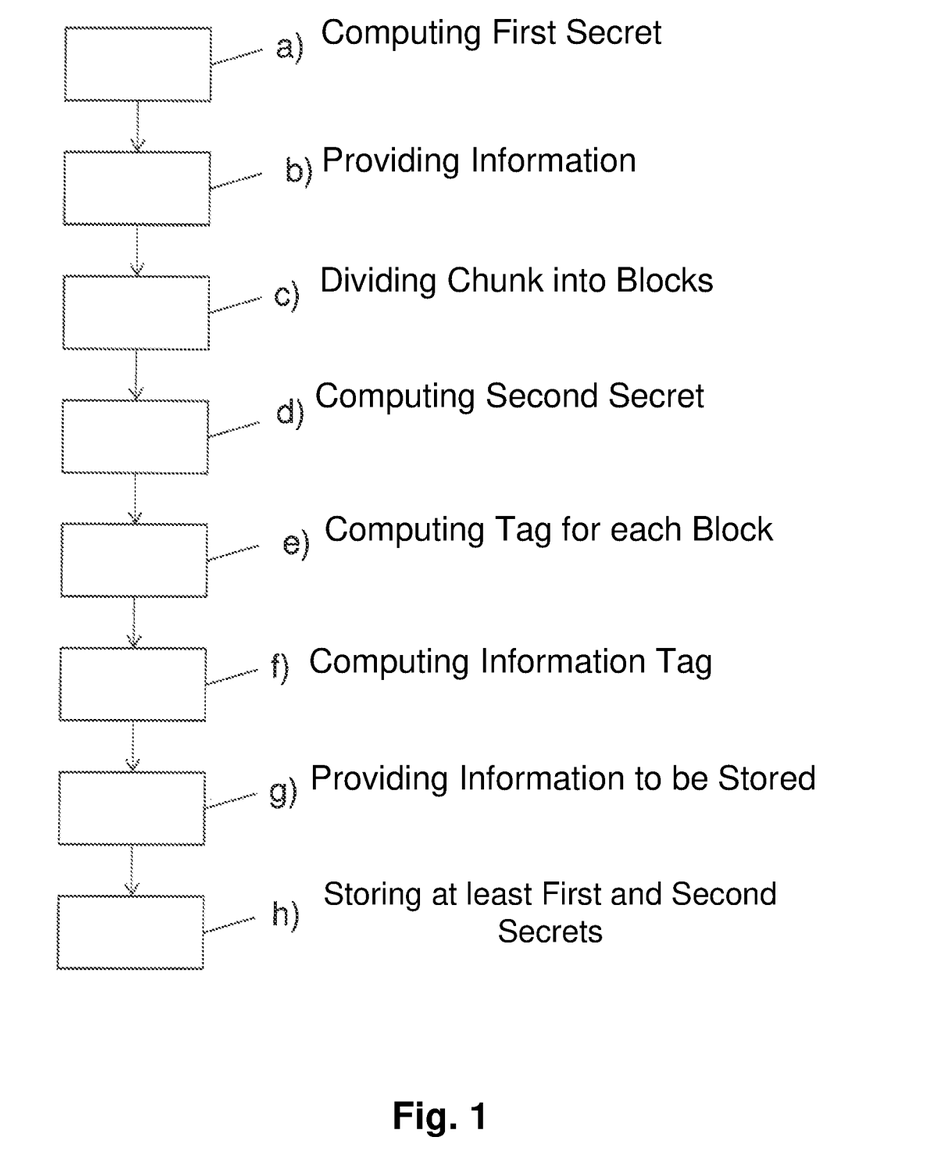
FIG. 1 shows a method for providing information to be stored according to an embodiment of the present invention.

FIG. 1 shows a method for providing information to be stored according to an embodiment of the present invention.

In FIG. 1 steps of a method for providing information to be stored, said method being performed in a memory available to one or more computation devices is shown.

The method comprises the steps of
a) Computing by a user computing entity a first secret for generating a random value based on a random function,
b) Providing the information to be stored as at least one chunk,
c) Dividing each chunk into a plurality of blocks, wherein each block comprises one or more elements, wherein each element may have the same size of bits,
d) Computing, by said user computing entity, a second secret, said second secret comprising one or more random elements, a random element being associated with an element of a block,
e) Computing a tag for each block in each chunk, wherein the tag for the j-th block of the i-th chunk is computed using
the output of said random function on input of at least one of
1) an output of an index function mapping each index j to a certain value and
2) a seed sampled for the i-th chunk,
the j-th block and
at least a one dimensional representation of said second secret,
f) Computing an information tag comprising said computed tags of each block of each chunk,
g) Providing information to be stored, said information comprising the information to be stored together with said information tag, and
h) at least said first secret and said second secret may be stored by the user computing entity.

In the following a user U, the data owner, plans to outsource his data M* to a service provider S. In addition, U is interested in acquiring regular proofs that his data is correctly stored and retrievable from S. To this end, the following procedures are or may be performed
Setup: Prepares the data before uploading it.
Store: Uploads the data.
POR: Verifies that the data is still retrievable, and
Update: Updates the outsourced data.

The setup procedure, a randomized protocol, generates for each of the different parties a public-private key pair. If a party only deploys symmetric key schemes, the public key is simply set to ⊥. For the sake of brevity, it is assumed for each of the subsequent protocols and procedures that an involved party always uses as inputs its own secret keys and the public keys of the other parties.

The store procedure, a randomized file-storing procedure processes a file M* from the user to be stored. The output M for the service provider marks the data that it should store. M may not be exactly equal to the original file M*, but it must be guaranteed that it can be recovered from M. For instance, M could be the result of applying an erasure code to M*.

Additionally, the output needs to comprise information which enables the execution of a POR protocol between a verifier V and S. This information is expressed by so-called POR tags T. Analogously, the user stores some information that allows to validate the responses received during a Dynamic POR execution. This information is denoted by the verification key k.

Formally, it holds that:

Store: [U:M*;S:⊥]→[U:k,S:M,T]

Further, the user (who holds the verification information k) and the provider S run a POR protocol or procedure to convince the user that M is still retrievable from S. It holds that:

POR: [U:k;S:M,T]→[U:dec$_u$]

The procedure run is accepted by the user if dec$_U$=TRUE.

For updating the outsourced file, the user and the provider communicate to update the outsourced file and, if necessary, the corresponding tags. It is:

Update: [U:k;S:M,T]→[S:M',T']

In a first embodiment the file is divided into blocks where a block is an array of sectors. Each sector is an element of a finite field, e.g., $\mathbb{Z}_p$. Moreover, for each block there is an individual tag that is likewise an element of the same field. In this embodiment several tags in respective small finite fields are used. One advantage is that the binary finite field $F_2$: $\mathbb{Z}_2$ can be used for all operations, yielding an enormous increase in the performance. A second advantage is that there are in principle no limitations in the length of a block.

Unless otherwise specified, all operations in this embodiment are performed in the finite field $F_2=\mathbb{Z}_2$. This embodiment needs only one single, established cryptographic building block, e.g. being a pseudo-random function PRF: $F_2^{l_{prf}} \to F_2^\lambda$ where $\lambda$ denotes the security parameter. A possible instantiation would be the use of AES-128 with a secret key $\kappa$ which maps $1_{prf}$=128 bits to $\lambda$=128 bits, that is PRF(x):=AES$_k$(x).

With respect to the notation, when B∈$F_2^s$ refers to a bit string of length s, i-th bit (where i∈{1, . . . , n}) in this bit string by S[i], i.e. in case of the set of strings $S_1, \ldots, S_n$, then $S_i[j]$ refers to the j-th bit in the i-th bit string.

This store procedure is initiated by the user U, holding a file M*. First, the user may execute an information dispersal algorithm (e.g., erasure code) to disperse M* into M—possibly after permuting the code entries. The structure of the codeword(s) is not necessarily reflected by the structure used for running the POR procedure.

To generate the additional file tags T, the user first divides the file into n bitstrings $M_1, \ldots, M_n$, each being s bits long in the following called a block. The file M of size n×s bits is then internally structured as a sequence of n bitstrings (or blocks) and looks as follows:

$M_1[1], \ldots, M_1[s]$ $M_n[1], \ldots, M_n[s]$ where each $M_i[j]$ represents one bit. There is no restriction on the length s of one block but for practical reasons, using a multiple of the basic processing unit of the computation device of the user can be used e.g., a multiple of 32 or 64 (depending on whether one operates e.g. on a 32-bit or 64-bit system).

In addition, the user uses two types of secrets: a key for the PRF $$k_{prf} \xleftarrow{R} \{0,1\}^{l_{prf}}$$

and $\lambda \times s$ bits. The latter is represented again by a sequence of $\lambda$ bit strings $\alpha_1, \ldots, \alpha_\lambda$ where $\alpha_i \in F_2^s$ is a bit string of length s. These are being arranged as a matrix as shown next:

$$\begin{pmatrix} \alpha_1 \\ \vdots \\ \alpha_\lambda \end{pmatrix} = \begin{pmatrix} \alpha_1[1] & \ldots & \alpha_1[s] \\ \vdots & \ldots & \vdots \\ \alpha_\lambda[1] & & \alpha_\lambda[s] \end{pmatrix} := A$$

wherein each entry of A is one bit.

The verification key that needs to be stored by the user is the PRF key $k_{prf}$ and the matrix A mentioned above:

$$k = (k_{prf}, A) \in F_2^{l_{prf} + \lambda \cdot s}$$

For example, if the PRF is instantiated with AES-128 as mentioned above and likewise a security parameter of $\lambda = 128$ is used, then the total length of the verification key that needs to be stored by the user is $(s+1) \times 128$ bits resp. $(s+1) \times 16$ bytes.

Finally, the user computes the tags T. These are essentially bitstrings of length $\lambda$ with one bitstring per block. That is, it holds $$T = (T_1, \ldots, T_n)$$

with $T_i \in F_2^{80}$. More precisely, each tag $T_i$ is computed as follows:

$$T_i := PRF(i) \oplus A \times M_i.$$

Here, $\oplus$ denotes the XOR-operation and the multiplication· involved in the matrix-vector-product is simply AND (symbolic representation: $\wedge$). A detailed formula on bit level is the following:

$$T_i := \begin{pmatrix} T_i[1] \\ \vdots \\ T_i[\lambda] \end{pmatrix} = \begin{pmatrix} PRF(i)[1] \oplus (\alpha_1[1] \wedge M_i[1]) \oplus \ldots \oplus (\alpha_1[s] \wedge M_i[s]). \\ \vdots \\ PRF(i)[\lambda] \oplus (\alpha_\lambda[1] \wedge M_i[1]) \oplus \ldots \oplus (\alpha_\lambda[s] \wedge M_i[s]) \end{pmatrix}$$

This the computation of one tag requires:
One invocation of PRF, e.g., one AES-execution
s AND-operations
s+1 XOR-operations Thus, the total effort sums up to n PRF-executions, $n \times s$ AND-operations and $n \times (s+1)$ XOR-operations. The latter are applied bitwise to given bitstrings. Using modern computing architectures, it should possible to run 32 or 64 of these operations in parallel.

The user keeps k secret and then may upload (M, T) to the provider.

In a second embodiment the Store procedure is initiated by the user U, holding a file M*. The data is prepared and divided into blocks exactly as described above. The same holds for the two secrets sampled by the user, i.e., a key for the PRF $$k_{prf} \xleftarrow{R} \{0,1\}^{l_{prf}}$$

and $\lambda \times s$ bits.

The difference between the above mentioned first embodiment and the present second embodiment is how the tags are computed. The tags are essentially bitstrings of length $\lambda$ with one bitstring per block. That is, it holds $$T = (T_1, \ldots, T_n)$$

with $T_i \in F_2^{80}$. In this second embodiment the user uniformly at random samples for each index $i \in \{1, \ldots, n\}$ a random value $r_i \in F_2^{l_{prf}}$ and sets up a local data base D where he stores $$D = \{(i, r_i)\}_i.$$

Given this, each tag $T_i$ is computed as follows:

$$T_i := PRF(r_i) \wedge A \times M_i.$$

To summarize the difference is that PRF is not applied to the index i directly as in the first embodiment but to the random value $r_i$ associated to the index i.

The user keeps k secret and may then upload (M, T) to the provider.

In a third embodiment all operations are performed in the finite field $F_p = \mathbb{Z}_p$ with $\log_2(p) \geq \lambda$.

Similar to the two previous first and second embodiment, this third embodiment requires only one single, established cryptographic building block, being a pseudo-random function $PRF: F_2^{l_{prf}} \to F_p$.

Moreover, a cyclic group $G = \langle g \rangle$ is needed where the order of g is p. Group G and generator g are publicly known.

The Store procedure according to the third embodiment is initiated by the user U, holding a file M*. First, the user may execute an information dispersal algorithm (i.e., erasure code) to disperse M* into M—possibly after permuting the code entries.

To generate the additional file tags T, the user divides again the file into blocks. This third embodiment enables in a flexible way a trade-off between computation effort of the provider and the size of the local storage on the user's side. The file is divided into m chunks where each chunk comprises n blocks assuming here each chunk comprises the same number of blocks. However, this is not a necessity. For instance, if m=1 then the local storage of the user is constant, i.e., independent of the file size, while the effort of the provider is maximal. In contrary, if each chunk contains n=1 blocks only, the size of the user storage is maximal while the computation effort of the provider is minimal. In the following, $M_{i,j}$ denotes the j-th block in the i-th chunk. Each block is an array of s elements of $F_p$. Similar to the other two embodiments $M_{i,j}[k] \in F_p$ denotes the k-th sector of $M_{i,j}$.

That is, the whole file is structured as follows:

$$\text{Chunk } 1 \begin{pmatrix} M_{1,1}[1] & \ldots & M_{1,1}[s] \\ \vdots & \vdots & \vdots \\ M_{1,n}[1] & \ldots & M_{1,n}[s] \end{pmatrix}$$

$$\vdots \quad \vdots$$

$$\text{Chunk } m \begin{pmatrix} M_{m,1}[1] & \ldots & M_{m,1}[s] \\ \vdots & \vdots & \vdots \\ M_{m,n}[1] & \ldots & M_{m,n}[s] \end{pmatrix}$$

The user now samples for each chunk i a seed $seed_i \in F_p$ and keeps it secret. In addition, the user samples s random elements $\alpha_1, \ldots, \alpha_s \in F_p$. The verification key is defined by $k := (\{(seed_1, \ldots, seed_m), (\alpha_1, \ldots, \alpha_s)\})$.

Further, the user computes the tags $T_{i,j}$ with $1 \leq i \leq m$ and $1 \leq j \leq n$, i.e. one tag per block. Each tag is a pair of elements in G, i.e., $T_{i,j} \in G \times G$. Each tag $T_{i,j}$ is computed as follows:

$$T_{i,j} = g\sum_{k=1}^{s} \alpha_k \cdot M_{i,j}[k] + r_{i,j}$$

where $$r_{i,j} := PRF(seed_{i,j}) \in F_p.$$

The user keeps k secret and then may upload (M, T) to the provider.

Figure 2:
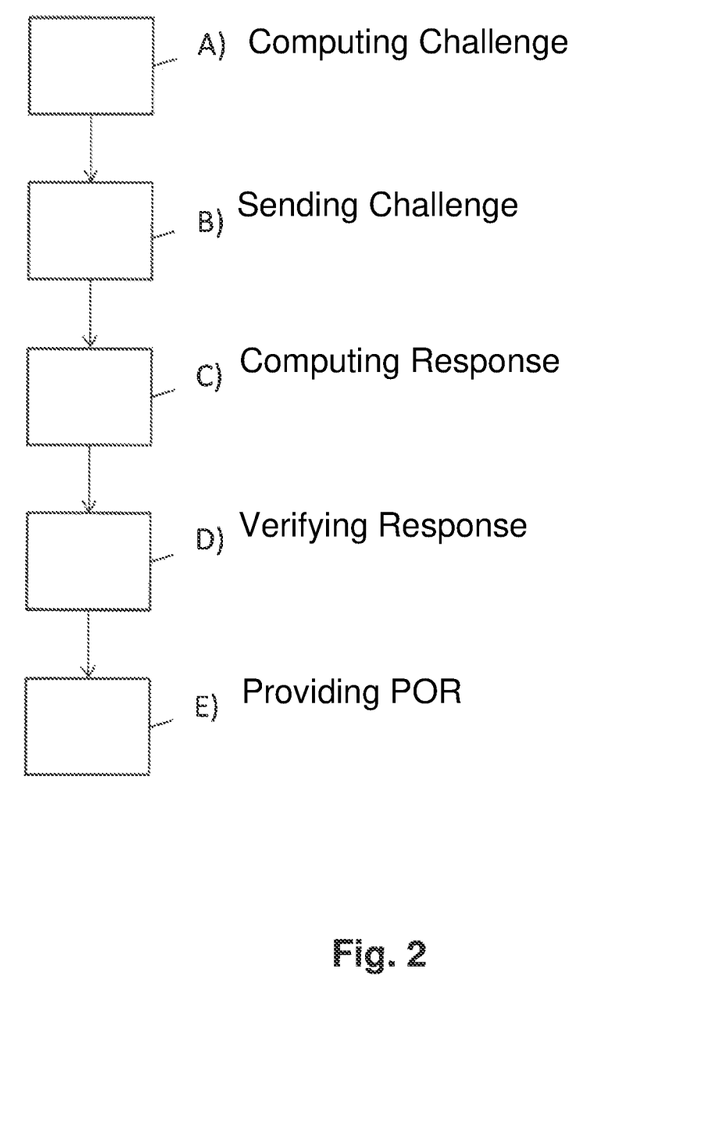
FIG. 2 shows a method for providing a proof of retrievability for stored information according to an embodiment of the present invention.

FIG. 2 shows a method for providing a proof of retrievability for stored information according to an embodiment of the present invention.

In FIG. 2 steps of a method for providing proof of retrievability POR for stored information according to an embodiment said method being performed in a memory available to one or more computation devices is shown.

The method comprises the steps of
A) Computing, by a user computing entity, a challenge, said challenge comprising at least one of
   at least one index of a block,
   at least one coefficient associated with said indices of said at least one block
B) Sending, by a user computing entity, said challenge to a storage entity, said storage entity providing information stored according to an embodiment,
C) Computing, by said storage entity, a response, said response comprising a combination of at least the blocks corresponding to the one or indices of said challenge and a combination of the file tags associated with at least said blocks,
D) Verifying, by the user computing entity, said response using a stored first secret and a stored second secret by comparing if
   a combination of the blocks in combination with said second secret and a combination of the output of the values of said random function based on said first secret with the values provided by the index function on input of the at least one index of the challenge with the file tag, and
E) Upon positive verification, providing a POR for said file.

To perform a POR according to the first embodiment, the user starts by generating a challenge Q of size $\ell$ which is a set of indices from $\{1, \ldots, n\}$:

$$Q = \{i_1, \ldots, i_\ell\} \subset \{1, \ldots, n\}.$$

This challenge is sent to the provider who has to return a response $(\mu, \tau) \in F_2^s \times F_2^\lambda$, wherein the response length is independent of the file length, meaning that the POR is compact in the sense of SW. These are computed as follows:

$$\mu = \bigoplus_{j=1}^{\ell} M_{i_j}, \quad \tau = \bigoplus_{j=1}^{\ell} M_{i_j}.$$

Here, $\oplus$ denotes again the bitwise XOR-operation. For instance it holds $$\begin{pmatrix} \mu[1] \\ \vdots \\ \mu[s] \end{pmatrix} = \begin{pmatrix} M_{i_1}[1] \oplus & \ldots & \oplus M_{i_\ell}[1] \\ & \vdots & \\ M_{i_1}[s] \oplus & \ldots & \oplus M_{i_\ell}[s] \end{pmatrix}$$

and likewise $$\begin{pmatrix} \tau[1] \\ \vdots \\ \tau[\lambda] \end{pmatrix} = \begin{pmatrix} T_{i_1}[1] \oplus & \ldots & \oplus T_{i_\ell}[1] \\ & \vdots & \\ T_{i_1}[\lambda] \oplus & \ldots & \oplus T_{i_\ell}[\lambda] \end{pmatrix}$$

Here the effort is to compute $(s+\lambda) \times (\ell-1)$ XOR-operations where again several XORs may be executable in parallel. Finally, the service provider sends to the user the response $\rho := (\mu, \tau)$. The user checks the validity of the response by checking $$A \times \mu \oplus \tau \stackrel{?}{=} \bigoplus_{j=1}^{\ell} PRF(i_j).$$

Expressed on the bit level, this means the following checks:

$$\bigoplus_{j=1}^{s} (\alpha_1[j] \wedge \mu[j]) \oplus \tau[1] \stackrel{?}{=} \bigoplus_{j=1}^{\ell} PRF(i_j)[1]$$

$$\vdots$$

$$\bigoplus_{j=1}^{s} (\alpha_\lambda[j] \wedge \mu[j]) \oplus \tau[\lambda] \stackrel{?}{=} \bigoplus_{j=1}^{\ell} PRF(i_j)[\lambda]$$

The effort for the POR according to the first embodiment is
$\ell$ executions of PRF and the XOR of their outputs
$\lambda \times s$ ANDS and $\lambda \times (s+1)$ XORs
$\lambda$ bit comparisons (or XOR and compare with zero).

To perform a POR according to the second embodiment, the user starts by generating a challenge Q of size $\ell$ which is a set of indices from $\{1, \ldots, n\}$:

$$Q = \{i_1, \ldots, i_\ell\} \subset \{1, \ldots, n\}.$$

This challenge is sent to the provider who has to return a response $(\mu, \tau) \in F_2^s \times F_2^\lambda$ These are computed exactly as described in the first embodiment.

The user checks the validity of the response by collecting the tuples $(i_j, r_{i_j}) \in D$ and validates if $$A \times \mu \oplus \tau \stackrel{?}{=} \bigoplus_{j=1}^{\ell} PRF(r_{i_j}).$$

The difference between the first and second embodiment is the input to PRF. Here in the second embodiment $PRF(r_{i_j})$ is used instead of $PRF(i_j)$.

To provide a POR according to the third embodiment, the user starts by generating a challenge Q of size $\ell$ which is a set of index tuples (i, j) from $\{1, \ldots, m\} \times \{1, \ldots, n\}$ and associated coefficients $c_{i,j} \in F_p$:

$$Q = \{(i_1, j_1, c_{i1,j1}), \ldots, (i_\ell, j_\ell, c_{i_\ell j_\ell})\}.$$

This challenge is sent to the provider who has to return a response $(\mu, \tau) \in G^s \times G$.

The response length is independent of the file length, meaning that the POR is compact in the sense of SW. These are computed as follows:

$$\mu_1 = g^{M_{i_j,j_1}[1]+\ldots+M_{i_l,j_l}[1]},$$

$$\vdots$$

$$\mu_s = g^{M_{i_1,j_1}[s]+\ldots+M_{i_l,j_l}[s]},$$

$$\tau = \prod_{k=1}^{l} T_{i_k,j_k}[1].$$

Finally, the service provider sends to the user the response $\rho := (\mu, \tau)$. The user checks the validity of the response by checking $$\mu_1^{\alpha_1} \cdot \ldots \cdot \mu_s^{\alpha_s} \cdot g^{\sum_{k=1}^{l} r_{i_k,j_k}} \stackrel{?}{=} \tau.$$

The values $r_{i_k,j_k}$ are computed from $\text{seed}_{ik}$ using equation:

$$r_{i,j} = PRF(\text{seed}_i, j) \in F_p$$

Figure 3:
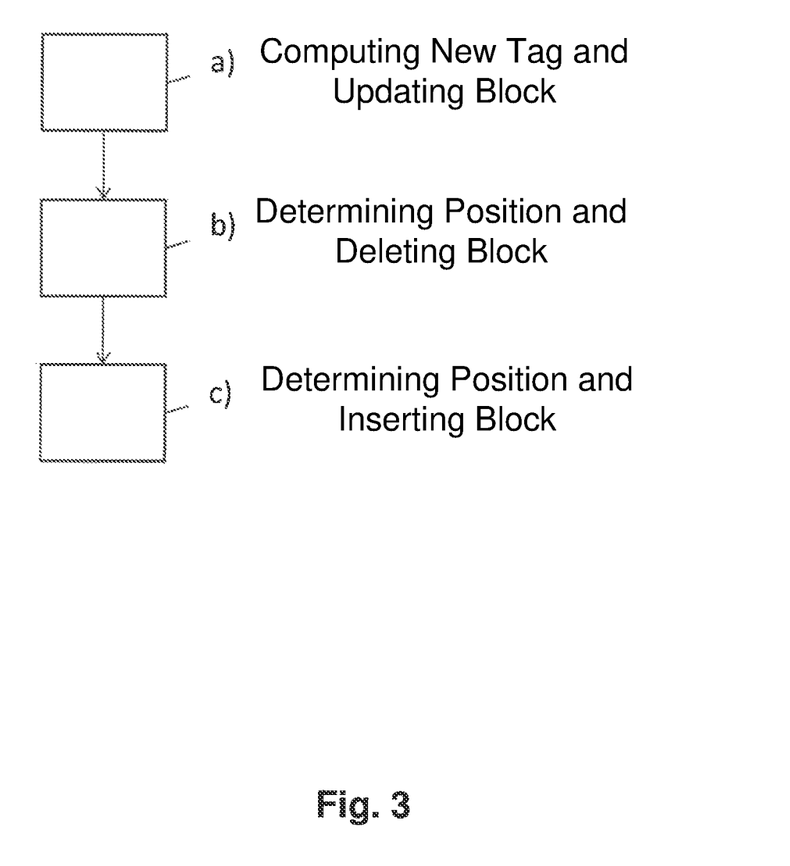
FIG. 3 shows a method for changing stored information on a storage entity according to an embodiment of the present invention.

FIG. 3 shows a method for changing stored information on a storage entity according to an embodiment of the present invention.

In FIG. 3 a method for changing stored information on a storage entity provided according to an embodiment, said method being performed in a memory available to one or more computation device is shown.

The method comprises at least one of the steps a)-c). The steps a)-c) are as follows:

a) For updating a block of the stored information, a new tag for said block is computed by a user computing entity and said new tag and a new block to replace the block to be updated is sent to the storage entity and wherein said storage entity determines the position of the block within said stored information to be replaced, replaces the block with the new block at said determined position and the corresponding tag with the new tag, and wherein b) For deleting a block of the stored information, the position of the block to be deleted within said stored information is determined, the storage entity deletes said block and the remaining blocks with an index higher than the index associated with the position of the deleted block are shifted subsequently to fill the position of said deleted block, and wherein if necessary the tags for one or more of said shifted blocks are updated using at least one of computing updated tags by the user and computing tag updating information by the user, sending said tag updating information to the storage entity, wherein the storage entity then computes updated tags based on the received tag updating information, and wherein c) For inserting a block of the stored information, the position of the block to be inserted is determined, the blocks with an index higher than or equal to the index associated with the position of the block to be inserted are shifted subsequently to free the determined position, the block to be inserted is inserted at said freed position, and wherein if necessary the tags for one or more of said shifted blocks are updated using at least one of computing updated tags by the user and computing tag updating information by the user, sending said tag updating information to the storage entity, wherein the storage entity then computes updated tags based on the received tag updating information.

Updating an outsourced file according to the second embodiment also needs for security reasons the tags and the local database D to be updated, i.e. in the case that blocks are changed, inserted, or deleted.

For updating a block the user and the provider are executing an interactive Update procedure. In the course of this procedure execution, the user wants to change one block $M_i$ to a different block $M'_i \neq M$, wherein the new block is placed at the same position where $M_i$ has been. The user proceeds as follows:
1. Choose a random value $r'_i \in F_2^{l_{prf}}$
2. Compute $T'_i := PRF(r'_i) \oplus A \times M'_i$
3. Replace $(i, r_i)$ in the data base by $(i, r'_i)$
4. Send $(M'_i, T'_i)$ so that these values can replace $(M_i, T_i)$ A rational attacker model has no incentive to refuse this change as this would not provide any clear benefit, e.g. a financial benefit or the like.

For deleting a block, i.e. a user aims to delete a block $M_i$ at position i, this means that block $M_{i+1}$ is shifted to position i, block $M_{i+2}$ is shifted to position i+1, and so on. On the user side, this means to update the data base as follows:
1. Delete the entry $(j, r_j)$ from D.
2. For each j>i, replace $(j, r_j)$ by $(j-1, r_j)$ For inserting a block, i.e. a user aims to insert a new block $M^*$ at position i, this means that block $M_i$ is shifted to position i+1, block $M_{i+1}$ is shifted to position i+2, and so on. On the user side, this means to update the data base as follows:
1. For each j≥i, replace $(j, r_j)$ by $(j+1, r_j)$ Moreover, the user samples a random value $r^* \in F_{2^{l_{prf}}}$ and inserts $(i, r^*)$ into D. Finally, he computes $T^* := PRF(r^*) \oplus A \times M^*$ and sends $(M^*, T^*)$ to the provider to be inserted into position i.

For maintaining locally the database D comprising a collection of tuples $(i, r_i)$, the first entry can be spared if D is represented as a table or array such that the i-th entry of D comprises the value ri associated to the index i. Under this assumption, the maximum storage taken by D is $$|D| = n \times l_{prf} \text{ bits}.$$

For instance, if PRF is instantiated by AES-128, this would translate to 16·n bytes. With respect to the values $r_i$, one could restrict to bit strings of shorter size and replace the PRF-calls $PRF(r_i)$ by $PRF(r_i\|0)$, meaning that the remaining positions are padded with zeroes. For security reasons, the length of the values $r_i$ should not be too small to avoid birthday-collisions, i.e., the event that $r_i = r_j$ holds by coincidence for i≠j. For this reasons, a size of 64 bits may be used but also 32 bits may be sufficient as well but this would require a more careful investigation to what extent collisions harm security. This would allow to reduce the size of D to 8 n bytes.

For updating a Block according to the third embodiment the user and the provider are executing the interactive Update procedure. In the course of this procedure execution, the user wants to change one block $M_{i,j}$ to a different block $M'_{i,j} \neq M_{i,j}$. The new block is placed at the same position where $M_{i,j}$ has been. The user computes a new first entry for the tag $$T'_{i,j}[1] = g^{\sum_{k=1}^{s} \alpha_k \cdot M'_{i,j}[k] + r_{i,j}}$$

and sends $(M'_{i,j}, T'_{i,j})$ to the provider The provider replaces $M_{i,j}$ by $M'_{i,j}$ and likewise $T_{i,j}$ by $T'_{i,j}$. A rational attacker model has no incentive to refuse this change as this would not provide any clear benefit.

For deleting a block, i.e. a user aims to delete a block $M_{i,j}$ at position j in the i-th chunk, resulting now in that chunks may have different sizes, making it necessary to store this information as well. This means that block $M_{i,j+1}$ is shifted to position j, block $M_{i,j+2}$ is shifted to position (i, j+1), and so on. To this end, the user chooses a new chunk seed $seed'_i$ and computes $$g_k := g^{PRF(seed'_i,k)-PRF(seed_i,k)} \text{ for } k = 1, \ldots, j-1 \text{ and} \quad 1.$$

$$g_k := g^{PRF(seed'_i,k)-PRF(seed_i,k+1)} \text{ for } k \geq j. \quad 2.$$

and sends these values to the provider. The provider uses these values to update the remaining tags as follows:
1. $T'_{i,k} := T_{i,k} \cdot g_k$ for k=1, . . . , j−1
2. $T'_{i,k} := T_{i,k+1} \cdot g_k$ for k≥j The communication and computation effort here scales with the chunk length. Thus, the smaller the chunks, the lower these complexities are but the larger the local storage.

For inserting a block a user aims to insert a new block M* at position (i, j), this means that block $M_{i,j}$ is shifted to position (i, j+1), block $M_{i,j+1}$ is shifted to position (i, j+2), and so on. To this end, the user chooses a new chunk seed $seed'_i$ and computes $$g_k := g^{PRF(seed'_i,k)-PRF(seed_i,k)} \text{ for } k = 1, \ldots, j-1 \quad 1.$$

$$g_k := g^{PRF(seed'_i,k)-PRF(seed_i,k+1)} \text{ for } k \geq j. \quad 2.$$

and also $$T'_{i,j}[1] = g^{\sum_{k=1}^{s} \alpha_k \cdot M*[k]+PRF(seed'_i,j)}.$$

The user sends $(M^*, T'_{i,j})$ to be used at position (i, j) and the values gk so that the provider can update the tags. These are computed as follows:
1. $T'_{i,k} := T_{i,k} \cdot g_k$ for k=1, . . . , j−1
2. $T'_{i,k} := T_{i,k+1} \cdot g_k$ for k>j.

The communication and computation effort here also scales with the chunk length. Thus, the smaller the chunks, the lower these complexities are but the larger the local storage.

Figure 4:
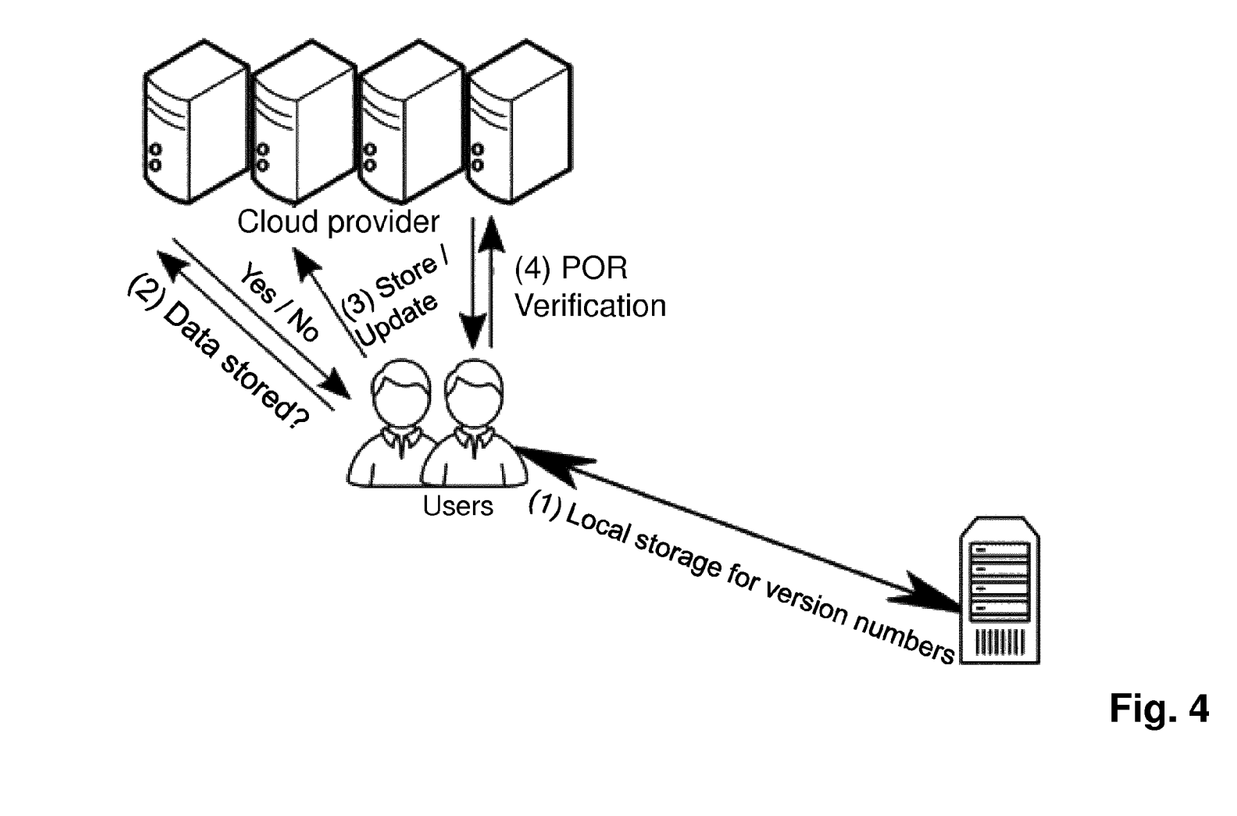
FIG. 4 shows steps of a method according to a further embodiment of the present invention.

FIG. 4 shows steps of a method according to a further embodiment of the present invention.

In FIG. 4 (1) a plurality of users stores version numbers for their data to be stored in the cloud provider locally. If the users would like to prove the retrievability of the data (2) the cloud provider may provide a proof of retrievability. In a step (3) the users may store or update their stored data at the cloud provider and may verify the proof of retrievability in a further step (4).

FIG. 5 shows an information structure according to an embodiment of the present invention.

In FIG. 5 an information structure, e.g. a file structure, to be stored according to the present invention is shown. The file comprises a plurality of m chunks. Each chunk in turn comprises a plurality of n blocks and each block comprises a plurality of k elements, also named sectors. In detail the chunk $c_3$ comprises n blocks and the block $b_3$ for instance comprises k sectors $s_1, \ldots, s_k$.

In a further embodiment the present invention provides a method for providing a POR comprising the steps of 1) Computing file tags by using very small sectors within each file block to create and verify file tags using XOR/AND operators and send the file and the tags to the cloud provider. This also applies for any modified/inserted/deleted parts of the file.
2) Verifier or user issues a challenge over a random sample of the blocks.
3) Cloud provider computes an answer based on those challenges.
4) The verifier verifies the response sent by the cloud using his key material and some metadata that is stored locally by the user.
5) If the verification passes, the user is certain that the data is stored in the cloud.

In summary at least one embodiment of the present invention provides or enables the following:
1) Relying on very small sectors within POR blocks to realize a very efficient POR scheme which can operate only with bitwise XOR and AND operators.
2) Modifying POR tags to allow users to dynamically update files and the associated tags while preserving POR properties over the updated/inserted/modified data.

In summary at least one embodiment of the present invention may have one of the following advantages:
enabling a very efficient proof of retrievability scheme which does not rely on any computational expensive operations only involving a bitwise XOR and AND operations
providing an efficient dynamic proof of retrievability
providing a proof of retrievability procedure with none or only a marginal overhead compared to conventional proof of retrievability schemes.
efficiently supporting dynamic updates of data for instance in the cloud.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for storing information, the method comprising:
   receiving information to be stored and an information tag from a user computing entity, wherein the information to be stored includes at least one chunk that is divided into a plurality of blocks each comprising one or more elements, wherein the information tag comprises a plurality of tags each having been computed for one of the blocks, and wherein the tag for the j-th block of the i-th chunk is based on:
      an output of a random function using as input at least one of:
         1) an output of an index function mapping each index j to a certain value, and
         2) a seed sampled for the i-th chunk,
      the j-th block, and
      at least a one-dimensional representation of a second secret comprising one or more random elements, wherein a respective one of the one or more random elements is associated with a respective one of the one or more elements of one of the plurality of blocks; and
   storing the information and the information tag,
   wherein the computation of the tags is performed using XOR and AND operations.

2. The method according to claim 1, further comprising providing a proof of retrievability for the stored information, comprising:
   receiving a challenge comprising at least one of:
      at least one index of at least one of the blocks, and
      at least one coefficient associated with the at least one index of the at least one block,
   computing and sending to the user computing entity a response comprising a combination of at least the blocks corresponding to the at least one index of the challenge and a combination of the tags associated with at least the blocks, wherein the response is verifiable by the user computing entity using a first secret and the second by comparing a combination of the blocks in combination with the second secret and a combination of the output of the values of the random function based on the first secret with the values from the index function using as input the at least one index of the challenge with the information tag.

3. The method according to claim 2, further comprising generating or receiving the proof of retrievability based on the user computing entity having successfully verified the response.

4. The method according to claim 1, further comprising changing a first one of the blocks of the stored information, comprising:
   receiving, from the user computing entity for updating the first block of the stored information, a new block to replace the first block and a new tag for the new block;
   determining a position of the first block within the stored information; and
   replacing the first block with the new block at the determined position and replacing the tag corresponding to the first block with the new tag.

5. The method according to claim 1, further comprising deleting a first one of the blocks of the stored information, comprising:
   determining a position of the first block within the stored information;
   deleting the first block and shifting remaining blocks with an index higher than the index associated with the position of the first block to fill the position of the first block; and
   updating the tags for one or more of the shifted blocks based on updated tags or tag updating information from the user computing entity.

6. The method according to claim 1, further comprising inserting a further block into the stored information, comprising:
   determining a position of the further block to be inserted within the stored information;
   shifting remaining blocks with an index higher than or equal to the index associated with the position of the further block to be inserted to free the determined position;
   inserting the further block to be inserted at the freed position; and
   updating the tags for one or more of the shifted blocks based on updated tags or tag updating information from the user computing entity.

7. The method according to claim 1, wherein the index function is an identity function.

8. The method according to claim 1, wherein the information to be stored is in one chunk.

9. The method according to claim 1, wherein the representation is a matrix.

10. The method according to claim 1, wherein a size of the elements is one bit.

11. The method according to claim 1, wherein each element of the one or more elements has a same number of bits.

12. The method according to claim 1, wherein a size of the blocks is identical or a multiple of an underlying central processing unit architecture of the user computing entity.

13. The method according to claim 1, wherein each chunk has the same number of blocks.

14. A storage entity for storing information, the storage entity comprising one or more hardware processors configured by computer code stored in memory to carry out a method comprising:
   receiving information to be stored and an information tag from a user computing entity, wherein the information to be stored includes at least one chunk that is divided into a plurality of blocks each comprising one or more elements, wherein the information tag comprises a plurality of tags each having been computed for one of the blocks, and wherein the tag for the j-th block of the i-th chunk is based on:
      an output of a random function using as input at least one of:
         1) an output of an index function mapping each index j to a certain value, and
         2) a seed sampled for the i-th chunk,
      the j-th block, and
      at least a one-dimensional representation of a second secret comprising one or more random elements, wherein a respective one of the one or more random elements is associated with a respective one of the one or more elements of one of the plurality of blocks; and storing the information and the information tag, wherein the computation of the tags is performed using XOR and AND operations.

15. The storage entity according to claim 14, being further configured to provide a proof of retrievability for the stored information, by the method including the following steps:
receiving a challenge comprising at least one of:
at least one index of at least one of the blocks, and
at least one coefficient associated with the at least one index of the at least one block,
computing and sending to the user computing entity a response comprising a combination of at least the blocks corresponding to the at least one index of the challenge and a combination of the tags associated with at least the blocks, wherein the response is verifiable by the user computing entity using a first secret and the second by comparing a combination of the blocks in combination with the second secret and a combination of the output of the values of the random function based on the first secret with the values from the index function using as input the at least one index of the challenge with the information tag.

16. The storage entity according to claim 14, being further configured to change a first one of the blocks of the stored information, by the method including the following steps:
receiving, from the user computing entity for updating the first block of the stored information, a new block to replace the first block and a new tag for the new block;
determining a position of the first block within the stored information; and
replacing the first block with the new block at the determined position and replacing the tag corresponding to the first block with the new tag.

17. The storage entity according to claim 14, being further configured to delete a first one of the blocks of the stored information, by the method including the following steps:
determining a position of the first block within the stored information;
deleting the first block and shifting remaining blocks with an index higher than the index associated with the position of the first block to fill the position of the first block; and updating the tags for one or more of the shifted blocks based on updated tags or tag updating information from the user computing entity.

18. The storage entity according to claim 14, being further configured to insert a further block into the stored information, by the method including the following steps:
determining a position of the further block to be inserted within the stored information;
shifting remaining blocks with an index higher than or equal to the index associated with the position of the further block to be inserted to free the determined position;
inserting the further block to be inserted at the freed position; and
updating the tags for one or more of the shifted blocks based on updated tags or tag updating information from the user computing entity.

19. A tangible, non-transitory computer-readable medium containing instructions, which upon being executed by one or more hardware processors, provides for execution of a method for storing information comprising:
receiving information to be stored and an information tag from a user computing entity, wherein the information to be stored includes at least one chunk that is divided into a plurality of blocks each comprising one or more elements, wherein the information tag comprises a plurality of tags each having been computed for one of the blocks, and wherein the tag for the j-th block of the i-th chunk is based on:
an output of a random function using as input at least one of:
1) an output of an index function mapping each index j to a certain value, and
2) a seed sampled for the i-th chunk,
the j-th block, and
at least a one-dimensional representation of a second secret comprising one or more random elements, wherein a respective one of the one or more random elements is associated with a respective one of the one or more elements of one of the plurality of blocks; and
storing the information and the information tagm
wherein the computation of the tags is performed using XOR and AND operations.

* * * * *